(12) United States Patent
Jia et al.

(10) Patent No.: US 7,743,177 B2
(45) Date of Patent: Jun. 22, 2010

(54) HIGH SENSITIVITY GLOBAL NAVIGATION SATELLITE SYSTEM (GNSS) RECEIVER PLATFORM HAVING DMA CONTROLLER FOR TRANSFERRING BETWEEN INTERNAL AND EXTERNAL MEMORY

(75) Inventors: Zhike Jia, San Jose, CA (US); Chi-Shin Wang, Half Moon Bay, CA (US); Lianxue Xiong, Shanghai (CN); Hongyu Zhang, San Jose, CA (US)

(73) Assignee: SIRF Technology Holdings, Inc., San Jose, CA (US)

( * ) Notice: Subject to any disclaimer, the term of this patent is extended or adjusted under 35 U.S.C. 154(b) by 123 days.

(21) Appl. No.: 11/771,976

(22) Filed: Jun. 29, 2007

(65) Prior Publication Data

US 2009/0002227 A1    Jan. 1, 2009

(51) Int. Cl.
*G01S 1/00* (2006.01)
*G01S 5/14* (2006.01)
*G06F 3/00* (2006.01)

(52) U.S. Cl. ............... 710/22; 710/8; 710/9; 710/10; 710/23; 342/357.12; 342/357.13; 342/357.14; 342/357.06; 370/221

(58) Field of Classification Search ............... 710/8–10, 710/22, 33; 342/357.06, 357.12–14; 370/221
See application file for complete search history.

(56) References Cited

U.S. PATENT DOCUMENTS

| | | | |
|---|---|---|---|
| 5,420,593 A * | 5/1995 | Niles | 342/357.12 |
| 5,504,684 A | 4/1996 | Lau | |
| 6,002,363 A | 12/1999 | Krasner | |
| 6,407,699 B1 | 6/2002 | Yang | |
| 6,430,503 B1 * | 8/2002 | McBurney et al. | 701/213 |
| 6,526,322 B1 | 2/2003 | Peng | |
| 6,754,509 B1 | 6/2004 | Khan | |
| 6,850,557 B1 * | 2/2005 | Gronemeyer | 375/150 |
| 6,930,634 B2 | 8/2005 | Peng | |

(Continued)

OTHER PUBLICATIONS

Gunawardena et al., "Real Time Block Processing Engine for Software GNSS Receivers", Institute of Navigation (ION) Nat ona Techn ca Meet ng (NTM) 2004, San D ego, CA, Jan. 26-28, 2004, pp. 371-377.*

(Continued)

*Primary Examiner*—Tammara Peyton
(74) *Attorney, Agent, or Firm*—Mark J. Danielson; Pillsbury Winthrop Shaw Pittman LLP

(57) ABSTRACT

Provided herein is multi-function platform comprising a plurality of devices and a large memory that is external to the devices and shared among the devices. In an embodiment, a Direct Memory Access (DMA) controller is provided for each device to efficiently transfer data between the device and the shared memory. More than one DMA may be provided for a device. For example, separate DMAs may be provided for different components of a device that perform different sub-functions enabling efficient transfer of data between the different components of the device and the shared memory. In another embodiment, each device comprises a local embedded memory and is provided with a DMA for transferring data between the local memory and the shared memory. Examples of devices that can be included in the platform include a GNSS receiver, a audio player, a video player, a wireless communication device, a routing device, or the like.

17 Claims, 4 Drawing Sheets

U.S. PATENT DOCUMENTS

| | | | |
|---|---|---|---|
| 6,952,573 B2 | 10/2005 | Schucker | |
| 7,010,060 B2 * | 3/2006 | Ledvina et al. | 375/316 |
| 7,047,368 B2 | 5/2006 | Vantalon | |
| 7,061,972 B1 | 6/2006 | Best | |
| 7,212,156 B2 * | 5/2007 | Bloebaum et al. | 342/357.12 |
| 2003/0142639 A1 * | 7/2003 | Cheung et al. | 370/321 |
| 2005/0174286 A1 | 8/2005 | Lokshin et al. | |
| 2005/0231424 A1 | 10/2005 | Bloebaum et al. | |
| 2006/0071851 A1 * | 4/2006 | Graas et al. | 342/357.14 |

OTHER PUBLICATIONS

G. Kappen and T.G. Noll, "Application Specific Instruction Processor Based Implementation of a GNSS Receiver on an FPGA", RWTH Aschen University, 2006, Proceedings of the conference on Design, automation and test in Europe: Designers' forum, pp. 58-63.*

* cited by examiner

FIG. 1 A GPS baseband hardware

HIGH SENSITIVITY GLOBAL NAVIGATION SATELLITE SYSTEM (GNSS) RECEIVER PLATFORM HAVING DMA CONTROLLER FOR TRANSFERRING BETWEEN INTERNAL AND EXTERNAL MEMORY

FIELD OF THE INVENTION

The present invention relates to multi-device platforms including a high sensitivity GNSS receiver that shares a common memory with other devices on the platform.

BACKGROUND OF THE INVENTION

Satellite-based radio navigation systems have become widely adopted in many commercial and military applications. Exemplary systems in operation or development include the NAVigation Satellite Timing and Ranging Global Positioning System (NAVSTAR GPS), the Global'naya Navigatsionnaya Sputnikovaya Sistema (GLONASS), a European satellite navigation system called GALILEO, the wide area augmentation system (WAAS), and the local area augmentation system (LAAS). These systems permit a user with an appropriate direct sequence spread spectrum (DSSS) signal receiver to determine his or her position. Direct Sequence Spread Spectrum is a modulation technique where a pseudorandom noise sequence directly phase modulates a data-modulated carrier. The DSSS signal has a noise-like spectrum and appears to be noise to all but the intended receiver.

As an example, the GPS constellation has 24 operational satellites. These satellites are positioned in six different orbital planes such that at any time a minimum of six satellites are visible to any user on the surface of the Earth, except in the polar region. The satellites operate in near circular 20,200 kilometers (about 12,000 miles) orbits at an inclination angle of 55 degrees and with approximately a 12-hour period.

Each satellite contains at least one atomic clock and transmits a navigation message that contains an accurate system time and its orbital position referenced to the atomic clock. The navigation message also contains clock behavior, status messages, and correction data such as ionospheric delay, time offset, etc. An almanac that gives the approximate data for each active satellite is also provided.

Each satellite transmits on two L-band frequencies: L1=1575.42 MHz and L2=1227.6 MHz. Three sets of pseudorandom noise (PRN or PN) ranging codes are in use: the coarse/acquisition (C/A) code, the precision (P) code, and the Y-code.

The C/A code set, also known as Gold code, has a 1.023 MHz chip rate. In spread spectrum technology, the term "chip" refers to a single bit of a pseudorandom sequence (PN-sequence) and the term "chip rate" refers to the rate at which bits of a PN-sequence are shifted. The Gold code therefore has a length of 1023 chips. The term "code" refers to the binary bit stream (the pseudorandom sequence) used to spread a signal over a wide range of frequencies for transmission. This spreading improves the accuracy of position estimation. Other advantages include interference rejection and low spectral power density, i.e., the power level at a given frequency.

A correlator at a receiver despreads this signal to the original data bandwidth by correlating it with a locally generated PN-sequence identical to and in synchronization with the PN-sequence used to spread the carrier at the radio transmitter, e.g., a GPS satellite vehicle (SV). Typically, this despreading occurs after the signal received at the antenna has been amplified and down-converted to a suitable low carrier frequency, also known as the intermediate frequency (IF). The hardware section associated with the amplification, down-conversion, and analog-to-digital conversion (ADC) is called the radio frequency (RF) stage. The other section, which processes the RF stage output and generates the position, velocity, and time information, is called the baseband (BB) stage.

It is necessary to acquire the satellite signal in order to determine the pseudorange or approximate distance to the navigation satellite from the receiver and to extract the navigation data. The Direct Sequence Spread Spectrum (DSSS) signal employed requires a perfect correlation of the received signal with a locally generated PN code in order to acquire the signal. Additionally, the local carrier frequency should be sufficiently close to the received signal frequency, in which the closeness of the local frequency to the received frequency depends upon the intended length of integration or correlation. In the exemplary case of GPS, the first or short time integration is done over a length of 1023 chips with an associated time duration of 1 ms. This requires a residual carrier frequency of less than 500 Hz. Any increase in this residual frequency will result in some of the samples within the correlation or integration length being phase reversed with a negative contribution to the integration value. This decreased integration value results in the receiver not being able to acquire the GNSS signal. This problem becomes more pronounced as the coherent integration length is increased. In an exemplary case where the integration length is increased to say 2 ms the residual frequency needs to be less than 250 Hz. Thus the range of residual frequency puts a constraint on the coherent integration length. In such cases non-coherent integration in which small length coherent integration powers are considered is used. However, this is an inefficient method to boost the signal to noise ratio and so coherent integration is usually preferred.

The received GNSS signal strength becomes weak due to receiver operation in indoors or when the signals are blocked as in the case of foliage or urban canyon. A long coherent integration, sometimes extending up to several hundred milliseconds, is needed to acquire the weak signal. In addition to this, several sequential correct signal confirmation stages may be required. The residue frequency error between the locally generated frequency and incoming IF signal from the RF module during the integration interval should be small and should not impact the acquisition sensitivity. As an example, a Fast Fourier Transform (FFT) with downsampling algorithm can be used for long coherent integration. In a case of, e.g., a 5120 ms length integration with a downsampling of 20 times, the resulting FFT points will be 256 with a corresponding frequency resolution of 0.2 Hz. That means that if the frequency change during the integration is more than 0.1 Hz, then the signal power will be dispersed to two or more frequency bins. This leads to the decrease of peak power and makes the acquisition or tracking sensitivity lower. Thus when the integration is long, the frequency change during the integration must be considered even though the receiver is static. The Doppler frequency change due to the satellite dynamics alone has an average value of 0.5 Hz/Sec with a maximum of 1 Hz/sec.

Thus under weak signal condition a long coherent integration may be required to acquire or track the signal. This long integration requires a large number of samples, which need to be stored in memory with a large storage capacity. Integrating such a large memory with the GNSS receiver on a single chip is problematic because the memory increases the cost and power consumption of the chip and takes up valuable real estate on the chip.

The GNSS receiver may be part of an infotainment system that also includes audio and video players as well as a host of other devices. Each of the devices in the infotainment system may require large amounts of memory at different times. For example, the audio player may require a large amount of memory when the GNSS receiver is not functioning or does not require a large amount of memory. On the other hand, the GNSS receiver may require a large amount of memory when other devices in the system are not in use.

Accordingly, there is a need for a multi-function platform comprising a large memory that is external to the GNSS receiver and can be shared among the receiver and other devices on the platform. This would optimize memory in the multi-function platform thereby reducing its the cost and size, as well as power consumption.

SUMMARY

Provided herein is multi-function platform comprising a plurality of devices and a large memory that is external to the devices and shared among the devices.

In an embodiment, a Direct Memory Access (DMA) controller is provided for each device to efficiently transfer data between the device and the shared memory. More than one DMA may be provided for a device. For example, separate DMAs may be provided for different components of a device that perform different subfunctions enabling efficient transfer of data between the different components of the device and the shared memory. In another embodiment, each device comprises a local embedded memory and is provided with a DMA for transferring data between the local memory and the shared memory.

Examples of devices that can be included in the platform include a GNSS receiver, a audio player, a video player, a wireless communication device, a routing device, or the like.

The above and other advantages of embodiments of this invention will be apparent from the following more detailed description when taken in conjunction with the accompanying drawings.

DETAILED DESCRIPTION

Figure 1:
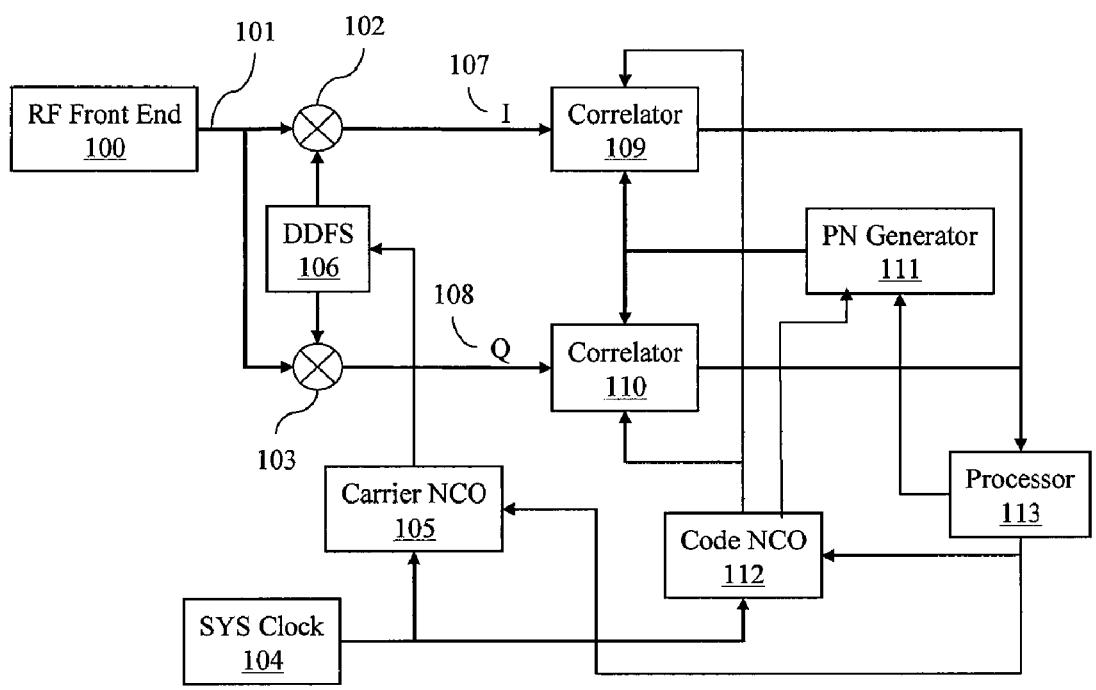
FIG. 1 is a block diagram illustrating an exemplary GPS receiver.

FIG. 1 illustrates an exemplary GNSS receiver. An RF front-end 100 processes the RF signal received at the antenna (not shown). Operations of a conversional RF front-end 100 include amplification, down-conversion, and analog-to-digital conversion. The RF front end 100 outputs an intermediate frequency (IF) signal 101 to a baseband section of the receiver from its analog-to-digital converter (ADC) output (not shown). The RF front-end 100 down converts the received RF into the intermediate frequency (IF) for baseband processing. The IF signal 101 is made available to two paths, one in-phase (I) and the other quadrature-phase (Q). In the I path, the IF signal 101 is multiplied in IF mixer 102 in-phase with a local frequency signal generated by a direct digital frequency synthesizer (DDFS) 106 to produce the in-phase (I) component 107. In the Q path, the same signal 101 is multiplied by the DDFS frequency quadrature-phase (i.e., with a phase shift of 90 degrees) to produce the quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase are almost the same as that of IF signal 101. As a result, the I and Q signals produced by the IF mixers 102 and 103 are near zero residue carrier frequency. In other words, the outputs I 107 and Q 108 of the IF mixers 102 and 103 are stripped or wiped off from the carrier (IF). The I and Q signals may be low-pass filtered to remove the high frequency components which are equal to twice the IF frequency band.

The I and Q components 107 and 108 are correlated in correlators 109 and 110, respectively, with a locally-generated pseudorandom (PN) sequence generated by a PN generator 111. The PN-sequence corresponds to the channel being processed by the baseband section at that time. The PN sequence generator is driven by code NCO 112. The local code generator frequency is made equal to the code rate of the I and Q paths by corrective feedback from the processor 113 to the code NCO 112. In addition, the processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113. Additional details of the receiver baseband section described above can be found in U.S. patent application Ser. No. 11/123,861, titled "Efficient And Flexible GPS baseband Architecture," filed on May 6, 2005, the specification of which is incorporated in its entirety herein by reference.

Figure 2:
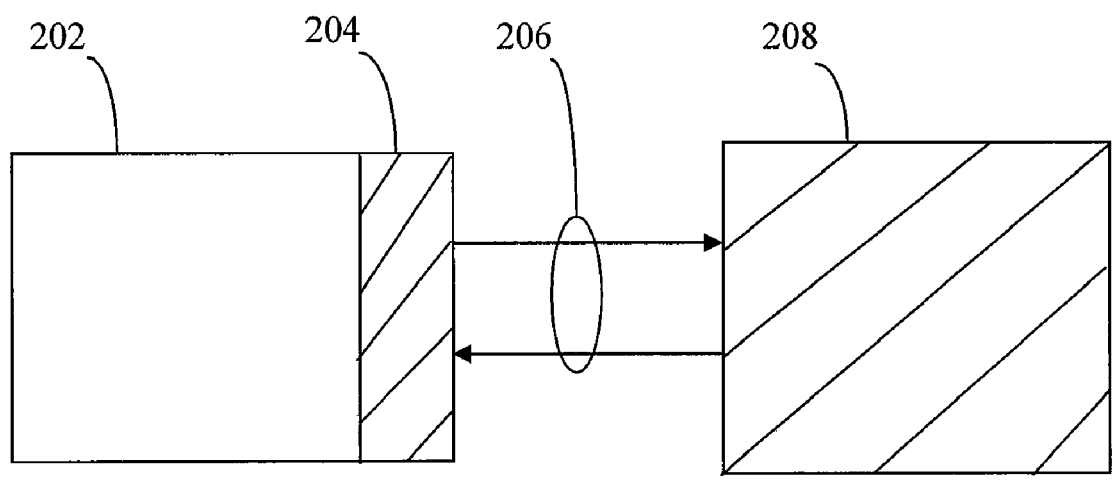
FIG. 2 illustrates a platform comprising a device with embedded local memory and a shared memory external to the device according to an embodiment of the present invention.

FIG. 2 illustrates an exemplary system according to an embodiment comprising a GNSS receiver 202, and a large shared memory 208 external to the receiver. Here external means that the memory 208 resides on a different semiconductor chip (off-chip) than the receiver 202. The GNSS receiver 202 may comprise the components shown in FIG. 1. The GNSS receiver 202 includes embedded on-chip memory 204 that interfaces to the shared memory 208 through a Direct Memory Access (DMA) controller 206. A DMA controller 206 controls the transfer of data between the two memories 204 and 208. The shared memory 208 may comprise Synchronous Dynamic Random Access Memory (SDRAM) and the embedded memory 204 may comprise Static Random Access Memory (SRAM). Data may be transferred between the GNSS receiver 202 and the shared memory 208, e.g., via a memory bus.

For the case in which the GNSS receiver performs long integration to increase sensitivity, the shared memory 208 may be used to store large sets of one millisecond correlation values while the small embedded memory 204 stores a smaller set of the correlation values downloaded from the shared memory 208 through DMA 206 and which is being used in current processing or integration.

In an exemplary embodiment, the GNSS receiver 202 interfaces to the shared memory 208 through several DMAs allowing different components that perform different sub-functions of the GNSS receiver to directly access the shared memory 208. For example, one DMA controller be may associated with the correlators of the GNSS receiver to transfer the correlation values (I/Q values) directly to the shared memory 208. A second DMA controller may be associated with a match filter to transfer the correlation values (I/Q values) directly to the shared memory 208. The match filter is functionally equivalent to many correlators in parallel. A third DMA controller may be associated with the PN code generator to transfer the long PN codes to the PN code generator directly from the shared memory 208. A fourth DMA controller may be associated with the digital signal processor (DSP) to exchange data and programs between the DSP's internal memory, e.g., SRAM, and the shared memory 208 external to the chip. A fifth DMA controller may be associated with a Fast Fourier Transform (FFT) engine so the input data, e.g., correlation values, to the FFT engine can be transferred directly from the shared memory 208 and the results of the FFT engine can be transferred directly to the shared memory 208.

Figure 3:
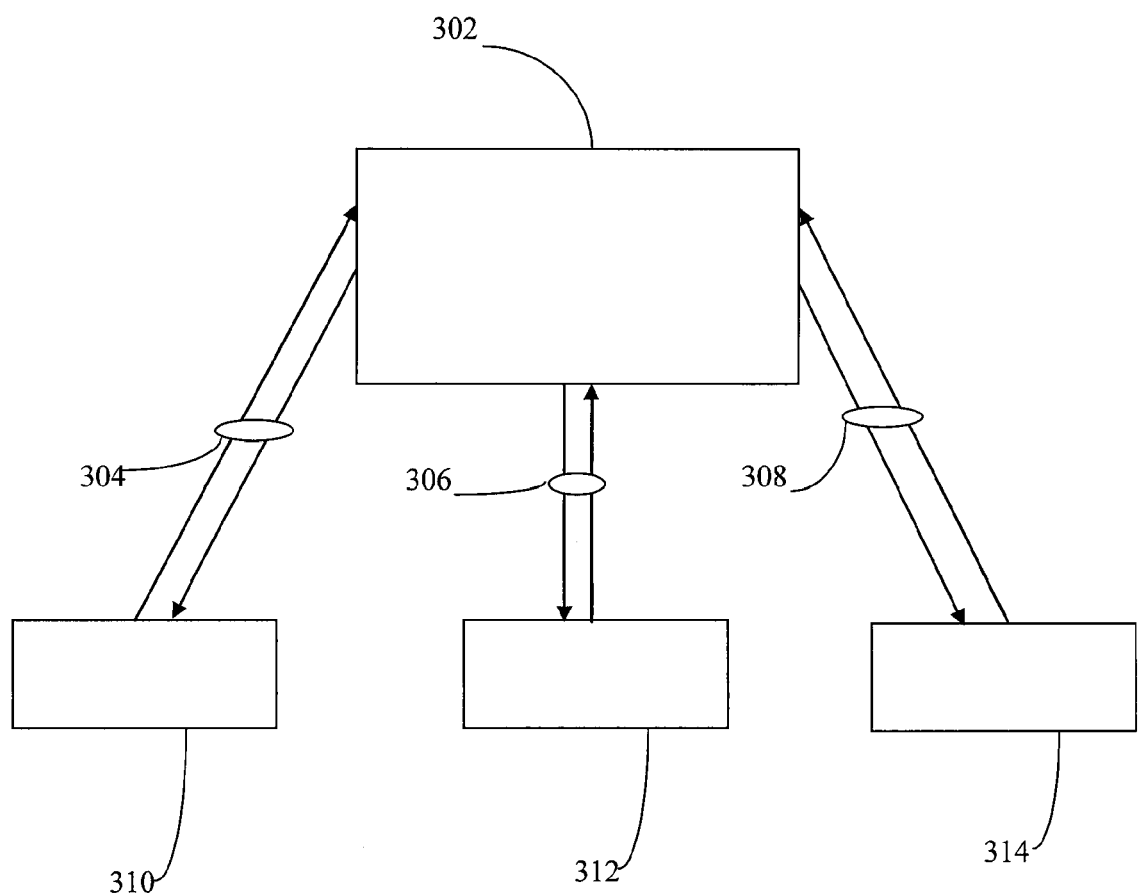
FIG. 3. illustrates a system comprising a plurality of devices sharing a common memory external to the devices according to an embodiment of the present invention.

FIG. 3 illustrates an exemplary platform 300 comprising a plurality of devices 310, 312, and 314 that share a common memory 302, e.g., SDRAM, external to the devices. Each of the devices 310, 312 and 314 interface to the shared memory 302 through DMA controllers 304, 306 and 308 respectively. The shared memory 302 may be accessed by any of the devices as required. The devices may comprise a GNSS receiver, an MP3 player or MPEG player or any other device. Each device may have several DMAs interfacing the device to the shared memory 302 allowing different components of the device to directly access the shared memory.

The platform may support several different devices. For example, the platform may support a GNSS receiver, audio player, video player, Bluetooth, satellite radio etc. The different devices on the platform may require only a large amount of resources, e.g., large memory space, high computational power, etc., at certain times. For example, in the case of a GNSS receiver, more memory and computational power are required when the receiver is acquiring a weak signal or under highly dynamic conditions. When the GNSS receiver is tracking a signal in static condition or acquiring a strong signal, it usually requires less resources, e.g., less memory and computational power. When the GNSS receiver uses less of the shared resources (e.g., shared memory) more of the shared resources are available for use by other devices. The resources may be assigned dynamically by software.

Each device may have its own embedded on-chip memory, e.g., for storing data currently being used by the device. Further, each device may have a number of DMA associated with different components of the device that perform different sub-functions of the device. For example, the GNSS receiver may include a DMA for the correlators or match filter of the receiver. In this example, the DMA may transfer the correlated values (I/Q values) outputted by the correlators to the shared memory for later processing, e.g., by the DSP. This may be done by first temporarily storing the correlated values in embedded on-chip memory, and then having the DMA transfer the correlation values from the on-chip memory to the shared memory. A DMA may also transfer uncorrelated samples of the received signal, e.g., from the output of the RF section directly or after down conversion by the IF mixers, to the shared memory. The DMA may later transfer these samples from the shared memory to host processors or a PC. This function is very useful in the research or development of the GNSS receiver.

The GNSS receiver is also capable of receiving similar sequences for other satellite navigation systems besides GPS. The shared memory may be used to store the PN sequences used in GNSS navigation. In the case of GPS, there are 32 PN sequences each having a length of 1023 chips. Generating these PN sequences during GPS operation is inefficient because the receiver requires additional circuitry and hence power. These PN sequences can be conveniently stored in the shared memory and transferred to the local on-chip memory as needed by the GNSS receiver.

The GNSS receiver may comprise a Digital Signal Processing (DSP) chip having small internal memory, e.g., SRAM. The DSP can make use of the large external shared memory to improve its performance. For example, the large external shared memory may be used to store large sets of data needed by the DSP to acquire a signal under weak signal conditions. For example, the DSP may perform long integration to acquire a weak signal, which requires a large set of correlation values. In this example, a DMA may transfer the correlation values needed for the long integration to the DSP internal memory just before the DSP carries out the integration. In another example, the DMA may transfer the correlation values in groups to the DSP internal memory as the DSP performs the integration. This way the DSP internal memory does not have to be large enough to store all the correlation values needed for the long integration at one time. Because of the large amount of memory required for long integration, the shared memory external to the receiver chip with fast DMA or similar data transfer techniques results in a better design which reduces the gate count and power of the receiver chip. The long integration may be several hundreds of milliseconds to several seconds.

In another example, the DSP may superimpose many consecutive frames of navigation data to decode the navigation data, which requires storing a large amount of data. When the received signal is weak, it is very difficult to determine the polarity of the navigation data bits in the satellite message even though the bit edges can be determined. In the case of GPS, the ephemeris data repeats in every subsequent frame with the same values for a period of two hours. These frames repeat at every 30 seconds. Therefore it is possible to determine the data bit polarity by superimposing the frames. This requires storing the consecutive frames in memory. In this example, a DMA may store the consecutive frames in the shared memory and transfer these frames to the DSP internal memory as needed by the DSP. Further details on decoding data bits under weak signal conditions can be found, for example, in U.S. patent application Ser. No. 11/612,421, titled "Ephemeris Download From Weak Signals," filed on Dec. 18, 2006, the specification of which is incorporated in its entirety herein by reference.

Fast Fourier Transform (FFT) techniques may be used in the acquisition and tracking of satellite signals. Under weak signal conditions, a long FFT involving a large number of points or samples may be used. The samples for the long FFT and the computed results of the long FFT may be stored in the shared memory. In these cases both I and Q values need to be stored. The presence of independent DMAs facilitate fast bi-directional transfer of the data. Techniques other than FFT may also be employed in the acquisition, tracking and reacquisition of the weak satellite signals. These other techniques may also require a large memory to store large number of signal samples and intermediate results to be processed.

The down converted signal samples may also be stored in the external shared memory before being processed by the baseband section of the receiver. For example, in the case of a software based receiver, these RF samples may be stored in the shared memory before processing. Thus the shared memory acts as a GNSS IF signal data logger which is very useful for GNSS receiver debugging and pure software GNSS receiver.

The amount of memory required by the receiver is partly determined by the required TTFF (Time to First Fix) during acquisition. This is because to shorter the TTFF time, the more I/Q values inside the two dimensional search space (both Doppler frequency and code phase) need be searched in parallel.

Other examples in which the receiver may require more memory include the following. Under high dynamic conditions, the acquisition, tracking and reacquisition operations of the receiver require that a large set of data to be stored, in which case having a large shared memory available is beneficial. Another example is when the receiver uses satellite orbital models to compute the positions of the satellites. In this example, the orbital models for different satellites may be stored in the shared memory, and retrieved by the receiver as needed to compute the position for a particular satellite.

The platform may comprise many devices such as the GNSS receiver, a map matching device, a routing device, an audio player, a video player, a wireless communication device, etc. Memory space on the shared memory can be assigned to these devices based on a scheduler or priority table. For example, the scheduler may assign more memory space to the GNSS receiver when the receiver is acquiring signals under weak signal conditions or is acquiring and tracking signals under dynamic conditions (e.g., when the receiver is moving). In this example, the GNSS receiver may detect a weak signal condition using a signal strength detector and send a message to the scheduler to allocate more memory to the GNSS receiver when a weak signal condition is detected. For the dynamics of the receiver, acceleration can be used as the index of dynamics. For example, if the platform includes accelerometers, then readings from the accelerometers can be used to determine the acceleration of the receiver, and hence detect a high dynamic condition. The PVT section of the GNSS receiver can also output the acceleration to detect a high dynamic condition. For example, if a Kalman filter based PVT algorithm is adopted, we can put accelerations into a state vector.

In some cases, two or more devices or functions may use the shared memory simultaneously depending on the memory required by each device or function. As an example, a portion of the shared memory may be assigned to the GNSS receiver while the remaining portion may used by the routing device.

Figure 4:
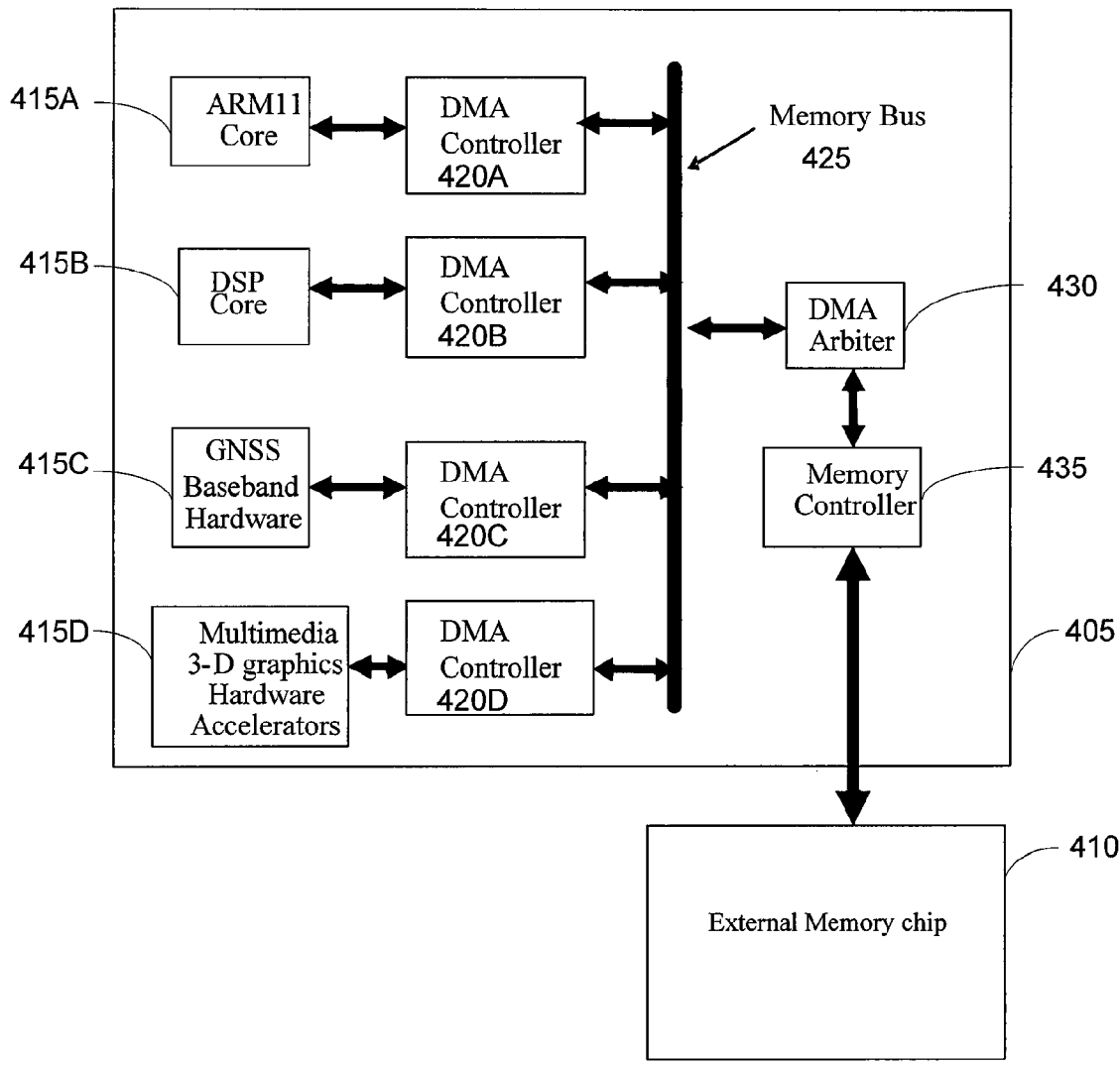
FIG. 4 illustrates a system comprising a plurality of devices integrated on a chip that share a common external memory according to an embodiment of the present invention.

FIG. 4 illustrates a platform according to an embodiment in which various modules 415A-415D are integrated on a common chip 405 and the modules share external off-chip memory 410, e.g., SDRAM. Together these modules 415A-415D may comprise the individual devices (e.g., GNSS receiver, media player, etc.) shown in FIGS. 2 and 3 integrated on a single chip. The size of the on-chip memory is an important parameter to consider when designing the chip 405. High sensitivity high dynamic GNSS signal acquisition, tracking reacquisition and navigation data decoding, etc. all require large memory. The modules 415A-415D on the chip 405 are connected to a memory bus 425, e.g., a 64-bit memory bus. When one module 415A-415D needs to access the external memory 410, a request is sent and the associated DMA controller 420A-420D efficiently transfers data in either direction from the external shared memory 410 to the local on-chip memory of this module 420A-415D.

A priority table is used to control the accessibility of the common memory 410 by various modules inside this chip 405. The table can be set and changed by software. The DMA arbiter 430 makes the arbitration based on this priority table if more than one module sends a request to access the external memory 410 at the same time. A memory controller 435 outputs and receives the data to and from the external memory 410.

With this shared external memory structure, only a small size of on-chip memory needs to be integrated on the chip 405. In this way, the chip cost is greatly reduced without impacting the performance of the GNSS receiver and other applications. For the GNSS receiver, a large number of signal samples can be stored in the external memory, which is necessary for long time coherent integration under weak signals conditions.

The external shared memory 410 is not dedicated for one specific function of the platform. The memory is shared by various functions including GNSS receiver, multimedia, 3-D graphics, etc. Further, the portion of the external memory 410 assigned to each function can be dynamically assigned by software, e.g., based on different use scenarios. For example, when the user is playing a 3-D game using the platform, more memory can be reserved for the 3-D engine on the chip 405. GNSS signal acquisition and tracking is a background task, and therefore only needs to use its internal on-chip memory to store samples for immediate processing.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A system platform comprising:
a global navigation satellite system (GNSS) receiver having a plurality of subfunctions to successively acquire and extract navigation data from a received GNSS signal, wherein the GNSS receiver device includes internal on-chip memory; a memory external to the GNSS receiver, wherein the memory is on a separate chip from the GNSS receiver; and a data transfer module for transferring data corresponding to the received GNSS signal between the internal memory of the GNSS receiver and the external memory, wherein the data transfer module is operative to use direct memory access (DMA) to transfer the data corresponding to the received GNSS signal between the internal memory and the external memory during successive processing of the received GNSS signal by each of the plurality of subfunctions such that data that has been processed by a first one of the subfunctions and transferred to the external memory by the data transfer module using DMA is further transferred by the data transfer module using DMA to the internal memory for processing by a second subsequent one of the subfunctions and wherein the first and second subfunctions process the data so as to acquire and extract navigation data from the same corresponding received GNSS signal.

2. The system of claim 1, wherein the data transfer module comprises a DMA controller, and the plurality of subfunctions includes correlators of the GNSS receiver and the DMA controller is configured to transfer correlation values from the correlators to the external memory.

3. The system of claim 1, wherein the data transfer module comprises a DMA controller, and the plurality of subfunctions includes a match filter of the GNSS receiver and the DMA controller is configured to transfer the correlation values from the match filer to the external memory.

4. The system of claim 1, wherein the shared memory stores PN sequences for different satellites, the data transfer module comprises a DMA controller, and the plurality of subfunctions includes a PN code generator of the GNSS receiver, and the DMA controller is configured to transfer a PN sequence from the external memory to the PN code generator of the GNSS receiver.

5. The system of claim 1, wherein the data transfer module comprises a DMA controller, and the plurality of subfunctions includes a digital signal processor (DSP) of the GNSS receiver, and the DMA controller is configured to transfer data and programs between an internal memory of the DSP and the external memory.

6. The system of claim 1, wherein the data transfer module comprises a DMA controller, and the plurality of subfunctions includes an FFT engine of the GNSS receiver, and the DMA controller is configured to transfer input data to the FFT engine from the external memory and transfer output results from the FFT engine to the external memory.

7. The system of claim 1, wherein memory space of the external memory used by the GNSS receiver depends on a signal strength of a received signal.

8. The system of claim 1, wherein memory space of the external memory used by the GNSS receiver depends on a required Time to First Fix.

9. The system of claim 1, wherein memory space of the external memory used by the GNSS receiver depends on the dynamics of the GNSS receiver.

10. The system of claim 1, wherein memory space of the external memory used by the GNSS receiver depends on a number of consecutive 30-second data frames needed to be downloaded to decode navigation data bits.

11. The system of claim 1, further comprising:
at least one device, wherein the memory external to the GNSS receiver is also external to and on a separate chip from the at least one device; and
data transfer module for transferring data between the at least one device and the external memory.

12. The system of claim 11, wherein the at least one device comprises an audio player, a video player, an Internet device, or other wireless communication or multimedia device.

13. The system of claim 11, further comprising a scheduler for dynamically assigning memory space in the external memory to the GNSS receiver and the at least one device.

14. The system of claim 13, wherein the scheduler assigns more memory space in the external memory to the GNSS receiver when a weak signal condition is detected.

15. The system of claim 13, wherein the scheduler assigns more memory space in the external memory to the GNSS receiver when a high dynamic condition is detected.

16. The system of claim 11, wherein the GNSS receiver and at least one device can share the external memory with different portions.

17. The system of claim 1, wherein the data transfer module comprises a DMA controller configured to transfer signal samples from an RF section of the GNSS receiver to the external memory when a baseband section of the GNSS receiver is bypassed.

* * * * *

UNITED STATES PATENT AND TRADEMARK OFFICE
CERTIFICATE OF CORRECTION

PATENT NO. : 7,743,177 B2
APPLICATION NO. : 11/771976
DATED : June 22, 2010
INVENTOR(S) : Jia et al.

It is certified that error appears in the above-identified patent and that said Letters Patent is hereby corrected as shown below:

On the Title Page, in Item (56), under "OTHER PUBLICATIONS", in Column 2, Lines 2-3, delete "Nat ona Techn ca Meet ng" and insert -- National Technical Meeting --, therefor.

On Title Page 2, in Item (56), under "OTHER PUBLICATIONS", in Column 2, Line 3, delete "Aschen" and insert -- Aachen --, therefor.

Signed and Sealed this
Twenty-ninth Day of January, 2013

David J. Kappos
*Director of the United States Patent and Trademark Office*